UNITED STATES PATENT OFFICE.

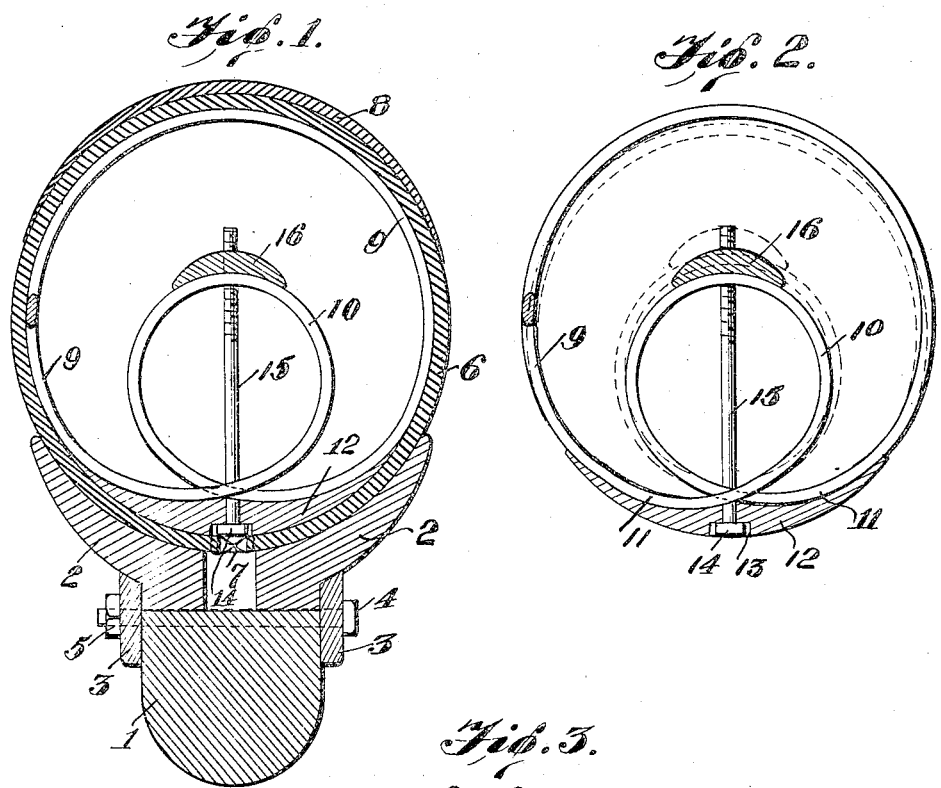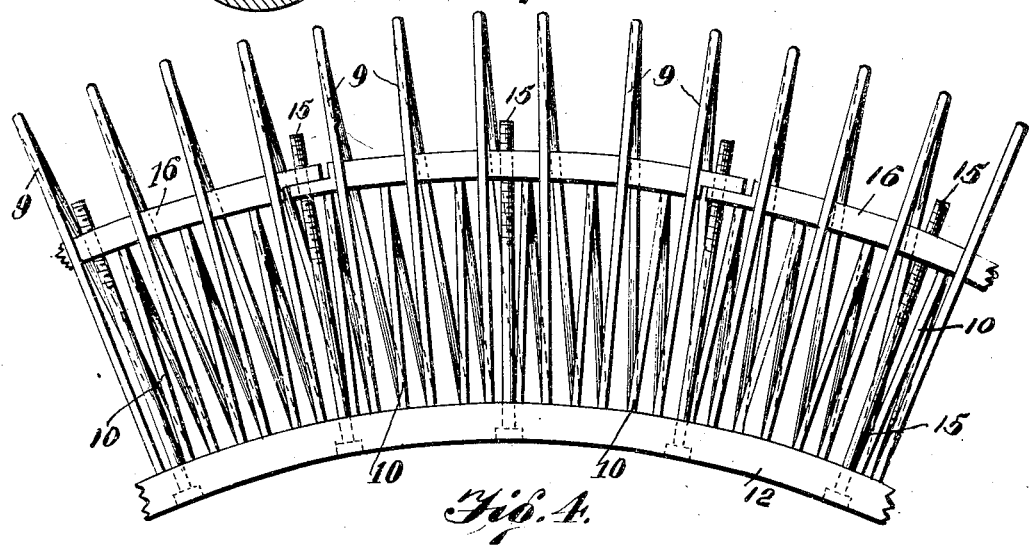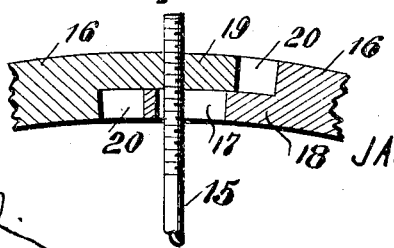

JACKSON M. O'REAR, OF BIRMINGHAM, ALABAMA.

RESILIENT TIRE.

1,042,592.  Specification of Letters Patent.  Patented Oct. 29, 1912.

Application filed October 27, 1910. Serial No. 589,376.

*To all whom it may concern:*

Be it known that I, JACKSON M. O'REAR, a citizen of the United States, residing at Birmingham, in the county of Jefferson and State of Alabama, have invented new and useful Improvements in Resilient Tires, of which the following is a specification.

My invention relates to an improvement in resilient tires of the type where an outer tire cover or casing is supported by an internal arrangement of springs which take the place of the inflated elastic inner tube now in general use in connection with pneumatic tires.

It is obvious if spring means can be devised to function in the manner of the pneumatic inner tube without being subject to its defects and weaknesses, an important and greatly needed advance will have been achieved in the art to which my invention pertains.

The basic idea of my invention consists in the provision of a spring support formed by alternate large and small convolutions of a spring metal strip of any desired cross-section, which convolutions may be formed in a continuous length for the whole tire or in smaller sections, or in single integral units comprising each a large and small convolution.

I provide means to engage the upper central points of the smaller convolutions, the bases of which are suitably supported on the felly or rim of the wheel, and by compressing said smaller convolutions toward the felly, I contract them and simultaneously expand the outer or larger convolutions, thus providing a means by which, after the tire cover is drawn over the outer convolutions of the spring support, the latter may be expanded to any suitable extent to hold the casing expanded with as great a pressure as can be obtained by the inflation of a pneumatic tube. Such an operation involves the movement bodily of the spring strip as the inner convolutions are compressed to expand the outer convolutions and for this reason the springs are not rigidly fastened to the felly or support but are permitted to slide back and forth over an inclined bearing plate which is mounted on the felly and conformed to the outer contour of the spring surfaces which rest thereon.

My invention which comprises the details of construction and arrangement of parts hereinafter more particularly described and claimed, is illustrated in one embodiment in the accompanying drawing, in which—

Figure 1 is a transverse sectional view of tire and rim with all parts in position. Fig. 2 is a similar view showing the spring supports and their bearing plates detached. Fig. 3 is a side view illustrating the spring arrangement in the form of a continuous coil of alternate large and small convolutions. Fig. 4 is a detail view showing the expansion joint provided for the sections of the compression ring.

Similar reference numerals refer to similar parts throughout the drawings.

I have shown my invention applied to a standard type of wheel, the details of which form no part of my invention and which comprises the felly 1, the rim sections 2 which rest upon the felly and are gripped between locking bands 3 which are held in position by bolts 4 and nuts 5. The outer tire cover or casing used comprises an annular section of fabric elastic or like composition 6, the edges of which are connected together by a lacing 7. A rubber tread portion 8 may be attached to the tire but it is understood that this tire casing may be of any standard type and the details shown form no special part of my invention.

The resilient support for the casing 6 comprises a spring formed by a strip of spring wire coiled to form large or outer convolutions 9, the bottom ends of each of which are continued to form an inner or smaller convolution 10, thus providing a spring support consisting of alternate large and small convolutions. Each large convolution 9 is formed integrally with a small convolution 10, the two constituting a unit and there being as many units or double convolutions formed in a continuous strip of spring metal as may be desired.

I prefer to form a number of compound convolutions 9 and 10 from an integral strip, to give each spring section sufficient length to provide a bearing surface therefor that will avoid the necessity of providing special means to support a single compound unit in radial position. The two convolutions 9 and 10 are supported by integral sections 11 of the spring wire, which sections are supported upon a bearing ring 12 which rests upon the rims 2 and has its upper surface, which supports the sections 11, curved to conform to the curve of said section 11, all of which is more clearly seen in Fig. 2. The bottom of this ring 12 is recessed at intervals to form pockets 13 which receive the heads 14 of screw bolts 15, the threaded ends of said bolts being adapted to screw into sections 16 of a clamp ring which engages the tops of the convolutions 10. These ring sections 16 are shown in Fig. 4 and where it will be seen that a screw bolt 15 passes through a slot 17 in a shouldered portion 18 on each section and is screwed into a shouldered portion 19 on the adjacent section which overlaps the shoulder 18, there being sufficient space or clearances 20 left between the ends of the shoulders 18 and 19 and the sections 16 to provide for the collapsing of the ring as it is drawn toward the wheel rim to clamp and compress the convolutions 10 for the purposes hereinafter described.

Before mounting the resilient tire upon the wheel, the screw bolts 15 are turned to relax pressure of the clamping upon the convolutions 10, permitting them to assume their maximum size and the convolutions 9 to assume their minimum size, the portions 11 sliding along the bearing 12 to permit this adjustment of the convolutions. The tire casing 6 is then slipped over the resilient support and drawn tightly about it by the lacing 7. The screw bolts 15 are then turned so as to draw the ring 16 inwardly which contracts the inner convolutions 10, causing the spring sections 11 to slide outwardly over the bearing 12, as the convolutions 10 are compressed, and to expand the outer convolutions 9 against the tire casing with a pressure which may be adjusted to the extent found most productive of the best wearing results for the outer casing. The tire is then mounted on the rim sections 2 which are drawn tightly into place by the bolts 4 and the tire is ready for service. Any abnormal strain or pressure exerted against a portion of the outer convolutions 9 will find the resilient strength of that convolution opposing it as well as the tendency of the adjacent inner convolution or convolutions 10 to resist the effort of the portion 11, which is receiving the strain on convolutions 9, to slip over its base 12 and expand the inner convolutions. In other words, the inner and outer convolutions 9 and 10 coöperate in resiliently resisting the tendency of the tire to give in a manner which is most nearly like the resiliency of the inflated tube that can be obtained mechanically.

While I have referred to the inner spring sections 10 as convolutions, they may be of any other shape provided they will expand the outer convolutions when compressed and hold them to their work in the manner described, the gist of my invention residing in the provision of the series of outer convolutions, as 9, which engage and support the casing in connection with means to expand said convolutions to the desired degree.

What I claim as new and desire to secure by Letters Patent, is:—

1. A tubular spring for resilient tires formed of spring wire bent to have large convolutions alternating with small convolutions, in combination with a base upon which portions of both large and small convolutions rest free of fixed connection therewith and means to contract the smaller convolutions and simultaneously expand the larger convolutions, substantially as described.

2. A resilient tire comprising in combination a ring support, a series of springs mounted on said support and comprising alternate large and small convolutions, a sectional ring resting upon the tops of the smaller convolutions, means to contract said ring and said smaller convolutions, and an outer casing surrounding the support and spring convolutions, substantially as described.

In testimony whereof I have hereunto set my hand in presence of two subscribing witnesses.

JACKSON M. O'REAR.

Witnesses:
  NOMIE WELSH,
  SALLIE FOSHEE.